US011087143B2

(12) United States Patent
Zhao et al.

(10) Patent No.: US 11,087,143 B2
(45) Date of Patent: Aug. 10, 2021

(54) SHOP PLATFORM USING BLOCKCHAIN

(71) Applicant: SAP SE, Walldorf (DE)

(72) Inventors: Xing Zhao, Shanghai (CN); Hong Liu, Shanghai (CN); Qing Zhang, Shanghai (CN); Xuemin Wang, Shanghai (CN); Rajnish Prasad, Bangalore (IN)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 16/219,111

(22) Filed: Dec. 13, 2018

(65) Prior Publication Data
US 2020/0193168 A1 Jun. 18, 2020

(51) Int. Cl.
| G06K 9/00 | (2006.01) |
| H04L 9/06 | (2006.01) |
| G06F 16/51 | (2019.01) |
| G06F 16/587 | (2019.01) |
| G06Q 20/20 | (2012.01) |

(52) U.S. Cl.
CPC ......... G06K 9/00785 (2013.01); G06F 16/51 (2019.01); G06F 16/587 (2019.01); G06K 9/00771 (2013.01); G06Q 20/203 (2013.01); H04L 9/0637 (2013.01); *H04L 2209/38* (2013.01)

(58) Field of Classification Search
CPC ............ G06K 9/00785; G06K 9/00771; H04L 9/0637; H04L 2209/03; G06F 16/51; G06F 16/587; G06Q 20/203
See application file for complete search history.

(56) References Cited

U.S. PATENT DOCUMENTS

| 6,108,033 A * | 8/2000 | Ito .................... G08B 13/19602 348/152 |
| 2006/0269103 A1* | 11/2006 | Brown ............... G06K 9/00778 382/103 |
| 2017/0061346 A1* | 3/2017 | High .................. G06Q 10/0639 |
| 2017/0185828 A1* | 6/2017 | Yamamoto .............. G06K 9/46 |
| 2018/0124319 A1* | 5/2018 | Jo ........................... G06T 7/215 |
| 2018/0286239 A1* | 10/2018 | Kaloyeros .............. G08G 1/144 |
| 2018/0308231 A1* | 10/2018 | Kish .................... G06K 9/4604 |
| 2019/0251364 A1* | 8/2019 | Park ....................... G06F 16/739 |
| 2020/0213329 A1* | 7/2020 | Simons ................. H04L 9/3226 |

* cited by examiner

*Primary Examiner* — Tom Y Lu
(74) *Attorney, Agent, or Firm* — Sterne, Kessler, Goldstein & Fox P.L.L.C.

(57) ABSTRACT

Disclosed herein are system, method, and computer program product embodiments for tracking shop information using blockchain. In an embodiment, a shop application system may gather information related to a shop using various sensors within the shop. For example, the shop application system may identify a flow rate of traffic within the shop or outside of the shop. The shop application system may securely transmit this information to a blockchain cloud platform to be stored onto a blockchain. The blockchain may also maintain store information from a client application system related to shop ownership or tenancy. In this manner, the blockchain may provide a public means for accessing transactions related to a shop as well as provide confidence in the information provided.

20 Claims, 6 Drawing Sheets

SHOP PLATFORM USING BLOCKCHAIN

BACKGROUND

As society continues to rely on information technology to store, access, and communicate information, a tension may arise between information that is available for public dissemination and information that is meant to be confidential. To add another layer of concern, the validity of the information or the ability to trust the information also becomes a question when information is accessed. A scenario where this information exchange may be a concern is with location information and data related to a particular location. For example, when considering property records for a store, various information may be identified as relevant, such as the ownership information, amount of traffic, or transactional information for the store. Further, consumers may wish to identify a level of confidence or trust associated with the gathered information so that the information is not dismissed as false or fraudulent. In this manner, store owners or property owners may wish to not only provide a level of confidence for the information but also to publicly disseminate information deemed available to the public.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
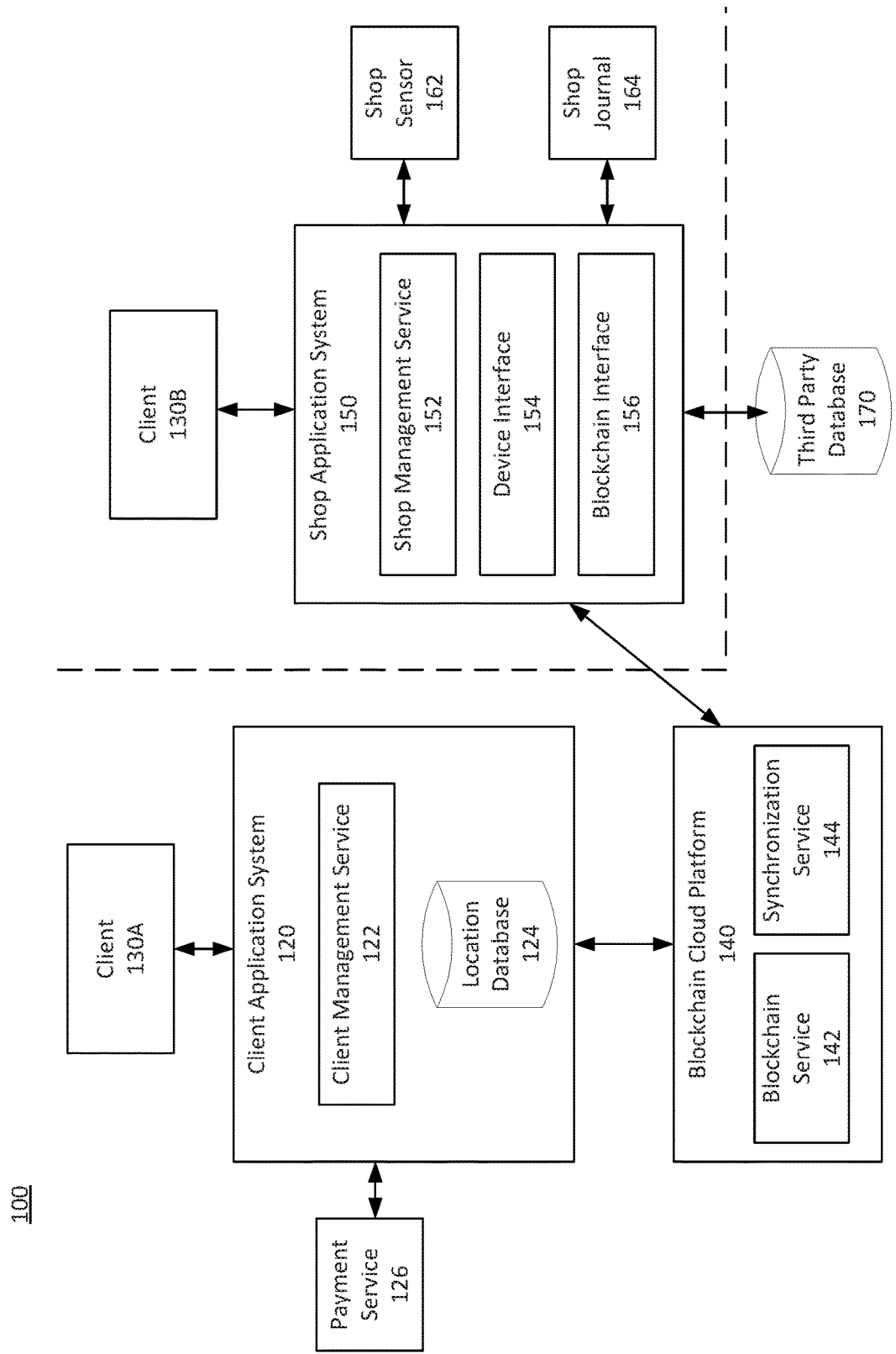
FIG. 1 depicts a block diagram of a blockchain shop environment, according to some embodiments.

Provided herein are system, apparatus, device, method and/or computer program product embodiments, and/or combinations and sub-combinations thereof, for disseminating shop information using a blockchain platform. While this description describes a shop scenario, the embodiments described herein may also be applicable to residential properties and/or other locations.

In an embodiment, a shop application system may reside within a particular location, such as a shop or a store. The shop application system may also reside in a residential area such as a home or apartment complex. It is noted that the shop application system may reside in any other location, so persons skilled in the relevant art(s) will appreciate that "shop" in the term "shop application system" is not limiting. Also, applications for using the shop application system are provided herein for illustrative purposes only, and are not limiting. In particular, the teachings of this disclosure are directed to and may be applied for applications, environments, systems, methods, processes, modules, networks, data and purposes not described herein, as will be appreciated by persons skilled in the relevant art(s).

The shop application system may gather information related to the location. The information gathered may depend on the configuration of the shop application system. For example, the shop application system may receive sensor or device information from cameras or door sensors. The shop application system may also receive shop information related to transactions occurring at the shop. For example, the shop application system may interface with point of sale (POS) devices to gather transaction information. Additionally, the shop application system may interface with a third party database which may allow for the gathering of additional information such as crime or criminal data. The shop application system may compile this information as statistics related to the shop.

The shop application system may provide an interface to a shop owner to review this information. The shop owner may be the owner of the property and/or may be a tenant leasing the property from a property owner. Using the shop application system, the shop owner may be able to monitor the flow of customers to determine the traffic of the shop. Similarly, the shop owner may view transactional information related to the shop. The shop owner may also use a graphical user interface accessible via a client device to identify and/or select information to be deemed publicly available.

Based on this selection, the shop application system may synchronize gathered shop information with a blockchain cloud platform. Using the blockchain cloud platform, the shop application system may independently provide shop statistics to the public in a trustworthy manner as the block writing transaction may be confirmed by multiple nodes in the blockchain. In this manner, the transaction blocks may provide confidence to parties viewing the shop information. To further provide this confidence, the shop application system may communicate with the blockchain cloud platform in a manner that may prevent the shop owner from tampering with the information provided. For example, the shop application system may perform a synchronization with the blockchain cloud platform directly and without intervention from the shop owner. While a shop owner may select the type of information to be available, the shop owner may not edit or modify the information provided to the blockchain cloud platform.

In addition to shop information or statistics, the blockchain cloud platform may also track information related to the shop property. For example, the blockchain cloud platform may track leasing information in a rental scenario. Similarly, the blockchain cloud platform may track ownership information and may record transactions as blocks. The blockchain may be operated by several entities to allow for confirmation of block transactions added to the blockchain. This configuration may yield a decentralized blockchain. By storing the shop information on the blockchain in a manner corresponding to the property, entities or individuals may access the blockchain to retrieve information related to the property. Each transaction may be represented by a block or may be included in a block containing multiple transactions that may be unedited by third-party entities. Based on this configuration, the blockchain may be able to provide trustworthy information because the stored transaction may be confirmed by multiple sources.

To view and/or modify the information stored on the blockchain cloud platform, a client application system may generate requests on behalf of client devices. For example, the client application system may be a cloud computing platform or a software as a service (SaaS) platform. The client application system may receive a request from a client to view and/or modify the information on the blockchain cloud platform. Depending on credential access, the client application system may retrieve from and/or add additional blocks to the blockchain. In this manner, the client application system may manage public client requests. Similarly, a shop owner may be able to access the blockchain cloud platform using the client application system as well as the shop application system. The client application system may also interface with a payment service to facilitate payment transactions related to the shop.

Using the shop application system and client application system to interface with a blockchain cloud platform, a network of communication may be created to facilitate the selective filtering of information that may be disseminated to the public. Further, the public may be more confident and/or trust the information stored on the blockchain cloud platform because of the verification of the added blocks by multiple entities.

Various embodiments of these features will now be discussed with respect to the corresponding figures.

FIG. 1 depicts a block diagram of a blockchain shop environment 100, according to some embodiments. Blockchain shop environment 100 may include a shop network and a public network. The shop network may be any non-public network. The shop network may exist for one or more shops that may communicate with blockchain cloud platform 140. A shop network may include shop application system 150, client 130B, shop sensor 162, and/or shop journal 164. An example embodiment of a shop network is further described with reference to FIG. 2.

The shop network may represent hardware and/or software components located within a shop or within a geographic location near a shop. For example, the shop network may encompass an area larger than the shop and/or may include indoor and outdoor locations. Shop application system 150 may be located in or near a shop and may gather information related to the shop. Shop application system 150 may also provide access to statistics generated based on the information gathered as well as an interface for a shop owner to view the statistics. The shop owner may use client 130B to access the shop information. Shop application system 150 may also include a blockchain interface 156 to communicate the gathered shop information to a blockchain cloud platform 140.

Shop application system 150 may include one or more processors, memory, servers, routers, modems, and/or antennae configured to interface with client 130B, shop sensor 162, shop journal 164, blockchain cloud platform 140, and/or third party database 170. Shop application system 150 may also include a shop management service 152, device interface 154, and/or blockchain interface 156.

Shop application system 150 may gather information from the shop and/or from the area surrounding a shop. For example, device interface 154 may connect to shop sensor 162 and/or shop journal 164. Shop sensor 162 may include one or more recording devices associated with the shop. For example, shop sensor 162 may be a camera or infrared counter. The camera may be, for example, an internee protocol (IP) camera. Using image and/or video information gathered from the camera, shop application system 150 may identify the traffic associated with the shop and/or identify individuals within the shop. To interface with the camera and/or infrared counter, device interface 154 may include an open platform communications (OPC) connector and/or a web service. The camera and/or infrared counter may connect to shop application system 150 via a programmable logic controller (PLC) and/or a web service.

Using information gathered by shop sensor 162, shop management service 152 may perform an analysis to determine information related to the shop. For example, visitor flow rate may be measured using quantitative statistics calculated by shop sensor 162 and/or shop application system 150. Shop management service 152 may then be able to determine the flow rate based on a comparison of images. Similarly, shop management service 152 may determine that the image is not fraudulent based on a comparison of images maintained in blockchain cloud platform 140. For example, blockchain cloud platform 140 may maintain validated reference information related to the shop. Shop management service 152 may perform image comparisons with reference images to provide increased confidence in the statistics generated by shop management service 152.

In addition to shop sensor 162, device interface 154 may also interface with shop journal 164. Shop journal 164 may include a system that collects transactional information or other shop management information. For example, shop journal 164 may be a system configured to track shop inventory and/or sales transactions. Shop journal 164 may include one or more systems, such as computing devices, inventory scanners, point of sale (POS) system, automated locker or storage devices, and/or other devices configured to provide bookkeeping for the shop. Depending on the configuration of shop journal 164, device interface 154 may interface with shop journal 164 using a configurable web connector or local area network (LAN) connection. In this manner, shop management service 152 may gather shop journal 164 data. Shop management service 152 may calculate a frequency of transactions using shop journal 164 data and may transmit this information in a blockchain data package sent to blockchain cloud platform 140.

Shop application system 150 may be further configured to access a third party database 170 for information relevant to the shop. While third party database 170 may be located external to the shop, shop application system 150 may access this third party information to perform further analysis for the shop and/or to package the retrieved information in a block on blockchain cloud platform 140. The third party database 170 may include, for example, crime or criminal information or records or local news information relevant to the shop. Shop management service 152 may be configured to poll and/or crawl various websites or Internet databases to compile the relevant information. Shop management service 152 may use a geographic area or address to perform the information gathering and/or machine learning techniques. This identifier of location may filter the results of the crawling. After identifying a record as corresponding to the location (e.g., an article or report may indicate the location of the shop or a location within a predefined area surrounding the shop), shop management service 152 may package the record into a blockchain data package to be sent to blockchain cloud platform 140.

Using the gathered information from shop sensor 162, shop journal 164, and/or third party database 170, shop management service 152 may compile statistics related to the shop. For example, shop management service 152 may identify traffic within the shop as well as outside the shop if shop sensor 162 monitors sidewalk traffic. Similarly, shop management service 152 may compile shop journal 164 information and/or correlate shop journal 164 information with shop sensor 162 information. For example, shop management service 152 may identify patterns related to sales or promotions or identify correlations between types of customers, purchase types, or amounts of traffic at different times of the day. Shop application system 150 may then provide this information to client 130B to allow a user or shop owner to view the information.

Client 130B may be a user device such as a computer, laptop, tablet, smart phone, or other device configured to display information and/or access a browser on a local area network (LAN) and/or the Internet. Using client 130B, a shop owner may view the shop information gathered by shop application system 150. The shop owner may also filter the type of information to be uploaded the blockchain cloud platform 140. For example, for privacy purposes, shop owners may not wish to publish financial information but may wish to highlight the amount of traffic received at the shop. Similarly, shop owners may set a rating calculator to set the granularity of information transmitted to blockchain cloud platform 140. For example, rather than a specific amount of income generated, shop owners may choose to use a pre-set rating to signify the amount of income. In an embodiment, the rating may be a high, medium, or low category and/or may display an income as a calculation of income over a period of time and per square meter. This rating calculator may also be configured to perform a calculation periodically to update the information related to the shop. In situations where a shop owner owns multiple shops, this information may aid in identifying information across different shops.

In addition to gathering information and/or supplying this information to shop owners, shop application system 150 may also include blockchain interface 156. Blockchain interface 156 may perform an initialization registration with blockchain cloud platform 140 and/or may synchronize data to blockchain cloud platform 140. Blockchain interface 156 may be a module configure to retrieve a private key from blockchain cloud platform 140. Using this key, blockchain interface 156 may add blocks to a blockchain hosted by blockchain cloud platform 140.

To upload information to the blockchain, blockchain interface 156 may interface with synchronization service 144. Blockchain interface 156 may periodically transmit image information and/or other shop statistics to blockchain cloud platform 140. Blockchain interface 156 may transmit this information in a raw format and/or may package the information into a block format to upload to the blockchain. In an embodiment, blockchain interface 156 may transmit this information without intervention by the shop owner. In an embodiment, the shop owner may provide permission and/or may confirm the information being sent to blockchain cloud platform 140.

Prior to transmitting data to blockchain cloud platform 140, blockchain interface 156 and/or shop management service 152 may compare the information to be transmitted with reference information to confirm that no fraudulent information will be uploaded to blockchain cloud platform 140. For example, if the information to be uploaded is an image, blockchain interface 156 may use computer version and/or machine learning techniques to compare the image with a reference image of the shop. This reference image may be pre-configured in shop application system 150 and/or may be retrieved from a cloud platform that may control shop application system 150 and/or client application system 120. If the application of the machine learning technique identifies the image as representative of the shop, blockchain interface 156 may transmit the image to blockchain cloud platform 140. If the images indicate a discrepancy, blockchain interface 156 may reject the image.

When blockchain cloud platform 140 receives information or block data from shop application system 150, blockchain cloud platform 140 may use blockchain service 142 to add the information as a block to a blockchain. Blockchain service 142 may be a Representational State Transfer (REST) service. The blockchain may include information from various shops. The blocks of the blockchain may represent transactions and/or synchronized data. In an embodiment, the block may include data identifying the shop so that the shop information may be correlated with leasing and/or ownership information that may be stored on the blockchain.

Blockchain cloud platform 140 may be operated by several entities to allow the public to have more trust in the information stored in the blockchain. Because the blockchain may not be operated privately, multiple entities may confirm transactions and/or provide a consensus regarding the information stored on the blockchain. In this manner, users accessing the information related to the shop may have increased confidence in the information stored on the blockchain. This information may aid in providing details about a shop or geographic area to aid in investment decisions. Further, the public availability of the blockchain may aid the shop in disseminating information to the public about the statistics related to the shop while still maintaining confidentiality.

In addition to adding synchronized shop statistics to the blockchain, blockchain cloud platform 140 may also track ownership or tenancy information related to the shop. For example, client application system 120 may allow users to view shop statistics and/or perform transactions related to ownership and tenancy.

To view information related to the shop, a user may use client 130A to access client application system 120. Client 130A may be similar to client 130B and include a computer, laptop, tablet, smart phone, or other device configured to display information and/or access a browser on a local area network (LAN) and/or the Internet. Client application system 120 may include one or more processors, memory, servers, routers, modems, and/or antennae configured to interface with blockchain cloud platform 140, payment service 126, and/or client 130A. Client application system 120 may instantiate a cloud computing platform such that client 130A may use a browser or locally installed application to perform cloud computing operations on client application system 120. To facilitate this cloud computing, client application system 120 may include client management service 122 and/or location database 124.

Client management service 122 may retrieve information from blockchain cloud platform 140 in response to requests from client 130A. For example, a user may wish to view statistics related to a particular shop. The user may supply an address and/or select the shop using a graphical user interface displayed on client 130A. In response to receiving the selection, client management service 122 may retrieve this information from the blockchain. Because this information is accessible to the public, client application system 120 may not require login credentials or permissions to view data stored on the blockchain. In some embodiments, however, client application system 120 may include security protocols such as a username or password to identify individuals and/or clients that have been granted permission to access the information on a blockchain. Client management service 122 may also perform preprocessing and/or may store temporary information (such as, for example, session information) in location database 124. Location database 124 may also temporarily store information related to leasing, tenancy, or ownership of a shop.

When a user requests information related to a shop or location, client management service 122 may generate a report based on the information queried from the blockchain. The report may be a file and/or may display on a graphical user interface for the user to view via client 130A. The report may include statistics from shop application system 150. These statistics may include patterns identified by shop application system 150, such as, for example, seasonal patterns, trending factors, crime factors, or factors related to shop owner influence. Shop owner influence may include monitored actions performed by a shop owner or decisions made by a shop owner.

The report may also include leasing and/or tenancy information related to the shop. Client application system 120 may manage the ownership, leasing, and/or tenancy information as well as modifications to this information. Based on updates or transactions related to the tenancy, client application system 120 may add transactions to the blockchain to represent a public record of the tenancy. While the foregoing description will describe this management in terms of leasing and sub-leasing, client application system 120 may provide updates to ownership information and/or tenancy information in a similar manner.

Client application system 120 may include a leasing platform or application executed by client management service 122. The leasing platform may register store or housing information on the blockchain corresponding to the location of the shop or residence. A user may indicate ownership of a geographical shop location using client application system 120. Client application system 120 may then register this shop ownership information with blockchain cloud platform 140. In an embodiment, distributed blockchain nodes may acknowledge the shop ownership and generate a license to the user registering the house. The license may be a data file and/or code such as a digital certificate indicating ownership of the property. When the owner uses client 130A to access the blockchain, the owner may provide this license in order to modify ownership or leasing information.

The license may also provide the owner with permission to access different functionality of client application system 120. For example, the owner may trigger a lease process and/or view and/or modify contractual information related to the shop and stored on the blockchain. In an embodiment, the public may view lease and/or contract information but may not modify the information. When triggering a lease process, an owner may use client 130A to indicate that a lease is to be generated. The lease may be an electronic contract or electronic file representing the contract. The owner may then use client application system 120 to deliver this document to the potential tenant. For example, client application system 120 may provide a link or send an email to the potential tenant. The potential tenant may then access client application system 120 to complete the lease contract. The potential tenant may also use payment service 126 to submit an initial payment or subsequent payments representing rent or a commission to the owner. Payment service 126 may include electronic payment systems such as electronic check or credit card information. Payment service 126 may also accept virtual currency or cryptocurrency. Payment service 126 may also include an online tax system to allow payment of taxes via client application system 120. After payment has been completed, the lease contract may be configured into a block and transmitted to blockchain cloud platform 140 to be added to the blockchain. In this manner, leasing information may be updated, maintained, and/or tracked using the blockchain.

Once a user has become a tenant, client application system 120 may provide options for the tenant to maintain information on the blockchain. For example, the tenant may use a client to access client application system 120. As previously stated, the client may use payment service 126 to submit payments to the property owner. The tenant may also trigger a process to terminate the lease or to renew the lease. These changes may or may not require approval from the owner before they are added to the blockchain.

The tenant may also trigger a lease transfer process. In this manner, the tenant may create a sub-lease arrangement. For example, a second tenant may assume the rent of the first tenant and/or may occupy the property during the first tenant's lease term. The second tenant may then use client application system 120 to pay the rent. Similarly, the first tenant may create a sub-lease where the second tenant assumes a portion of the rent and/or uses a portion of the property. Both the first tenant and the second tenant may then pay rent using payment service 126. In an embodiment, the second tenant may pay rent to the first tenant who pays rent to the owner.

The owner may use client application system 120 to collect rent and/or view transactions to determine whether rent has been paid. Depending on the configuration and/or selected payment method, client application system 120 may route payments and/or provide routing information so that the owner receives the rent payment. For example, client application system 120 may collect funds and/or provide the owner's account information to the selected financial institution source of the payment so that payment is delivered to the owner's account.

Because the owner is able to receive rent based on the agreed upon conditions of the lease, approval from the owner may not be required for a tenant to generate a sub-lease. In this manner, the tenant may generate a sub-lease in a manner similar to the lease generated by the owner. Upon completion of the conditions for creating the sub-lease, client application system 120 may transmit the transaction to blockchain cloud platform 140 to add to the blockchain as a new block. In this manner, the blockchain may maintain the tenancy information related to the property for the parties even if certain parties are not directly involved with a transaction.

To generate a lease, client management service 122 may also include an application service. The application service may publish available leases to potential tenants. An owner may designate a lease as available for rent. A potential tenant may browse the available leases. For example, a potential tenant may access client application system 120 using an Internet browser. The potential tenant may view the property information stored in the blockchain and/or a subset of the information depending on the configuration of client application system 120, such as, for example, the transaction history of the property. The potential tenant may submit an application to lease the property. The application may be customized by the owner and/or may request particular information for the owner to approve the application. The owner may review the application using client 130A and by accessing client application system 120.

Upon approval, the tenant may gain access to additional information stored on the blockchain and/or may be permitted to view the property. The additional information, for example, may include additional property information and/or previous transaction information. Client application system 120 may be able to provide traceability with previous transactions. Based on this additional information, the tenant may confirm an agreement to rent the property and/or to continue with the lease process. This confirmation may be received at client application system 120 via a graphical user interface provided to a client accessed by the tenant. Upon confirmation, client application system 120 may generate data representing the completed lease agreement and may upload the lease agreement to the blockchain on blockchain cloud platform 140. The completion of the agreement may occur with or without payment from the potential tenant. For example, the potential tenant may perform a payment using an offline approach or without client application system 120. In an embodiment, each completed step in the application may cause client application system 120 to add a block to the blockchain.

In addition to generating leasing information, an owner may also manage one or more properties using client application system 120. The owner may manage leases for these properties and may also terminate leases. Additionally, the owner may also view and/or provide notes related to the property. For example, the owner may indicate that upgrades have been added to the property or that maintenance was recently performed. This information may be added to the blockchain with a reference to the property.

Based on this configuration, the blockchain maintained by blockchain cloud platform 140 may facilitate information from both shop application system 150 as well as client application system 120. The information provided in the blocks may include an indicator of a particular property despite being received from difference sources. Further, the distributed nature of the blockchain may provide dissemination as well as confidence in the information provided. In this manner, the public may more easily access the property information as well as enter into transactions using the information managed on the blockchain. This configuration may also be applicable in the transfer of ownership of property and/or in the leasing or owning of a home or residence.

Figure 2:
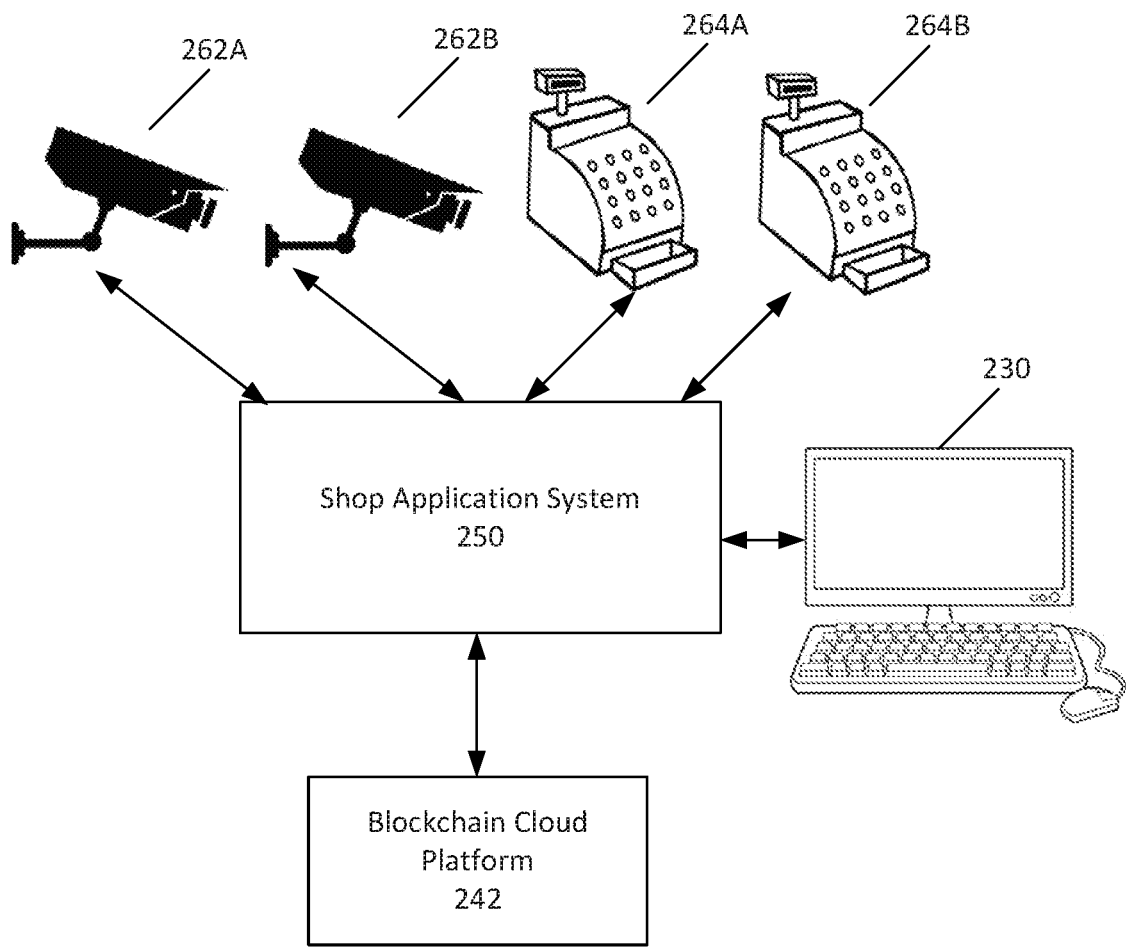
FIG. 2 depicts a block diagram of a shop application system, according to some embodiments.

FIG. 2 depicts a block diagram of a shop application system 250, according to some embodiments. Shop application system 250 may be similar to shop application system 150 as described with reference to FIG. 1. Shop application system 250 may be located in or near a shop. Shop application system 250 may interface with one or more cameras 262, point of sale (POS) systems 264, and/or client 230. Shop application system 250 may also communicate with blockchain cloud platform 242.

Shop application system 250 may receive image data from cameras 262. Cameras 262 may be positioned within the shop or outside of the shop. Using the information from cameras 262, shop application system 250 may identify statistics related to the shop such as the traffic of the area or within the shop. Traffic may be measured in the number of distinct people identified in a period of time. Shop application system 250 may also segment different amounts of time to identify times of low traffic and times of high traffic. Similarly, shop application system 250 may receive transaction information from POS systems 264. This transaction information may include items or services that have been purchased as well as the payment provided. Shop application system 250 may identify high transaction times and/or low transaction times. Similarly, shop application system 250 may monitor the types and/or quantities of items or services purchased.

With the information received from cameras 262 and/or POS system 264, shop application system 250 may generate a rating for the shop. The rating may reflect a predictive score signifying the profitability of the shop. In an embodiment, the rating may examine the amount of traffic flow both inside and/or outside of the shop as well as the quantity and/or qualitative factors related to the transactions occurring at POS systems 264. With this information, shop application system 250 may generate a rating and/or a recommendation regarding the profitability of the location. For example, the rating may be determined as an income rate per geographic area (such as square meters).

To generate this rating, shop application system 250 may apply machine learning algorithms to the information gathered. These machine learning algorithms may be trained using training sets to identify relevant information and/or weights to apply to the information gathered. Using these algorithms, shop application system 250 may generate a rating. Shop application system 250 may then present this rating to client 230.

A shop owner may use client 230 to review the statistics related to the shop. Using the statistics, a shop owner may modify elements of the shop, such as, for example, particular products or particular sales promotions. The shop owner may also view the rating. The rating may aid in providing a performance metric for the shop relative to other shops. For example, the training sets may have been empirically determined based on the performance of other shops and the machine learning algorithms may yield ratings relative to other shops. For example, the rating may indicate a high, medium, or low profitability metric for the shop relative to other nearby shops. This information may aid an owner of the property, for example, in determining whether to continue with a lease or whether to terminate a lease.

Similarly, an owner may determine that a high rating would deem a property as desirable. The owner may then wish to advertise this high rating. In this manner, the owner may permit shop application system 250 to transmit the rating to blockchain cloud platform 242 and to include the rating as publicly accessible information. The blockchain may also include images gathered from cameras 262 and/or transaction information from POS system 264. In an embodiment, shop application system 250 may edit this data for privacy reasons. For example, shop application system 250 may blur images containing faces and/or may blur transaction information identifying individuals and/or account information.

Because of the secure connection between shop application system 250 and blockchain cloud platform 242, potential tenants viewing the information related to a shop may have more confidence in the information provided. In this manner, if a potential tenant is looking to lease property to open a shop, the potential tenant may view profitability metrics related to the property before entering into a lease. With this information being trusted due to the blockchain structure, potential tenants may have more security in estimating the profitability of a venture.

Figure 3:
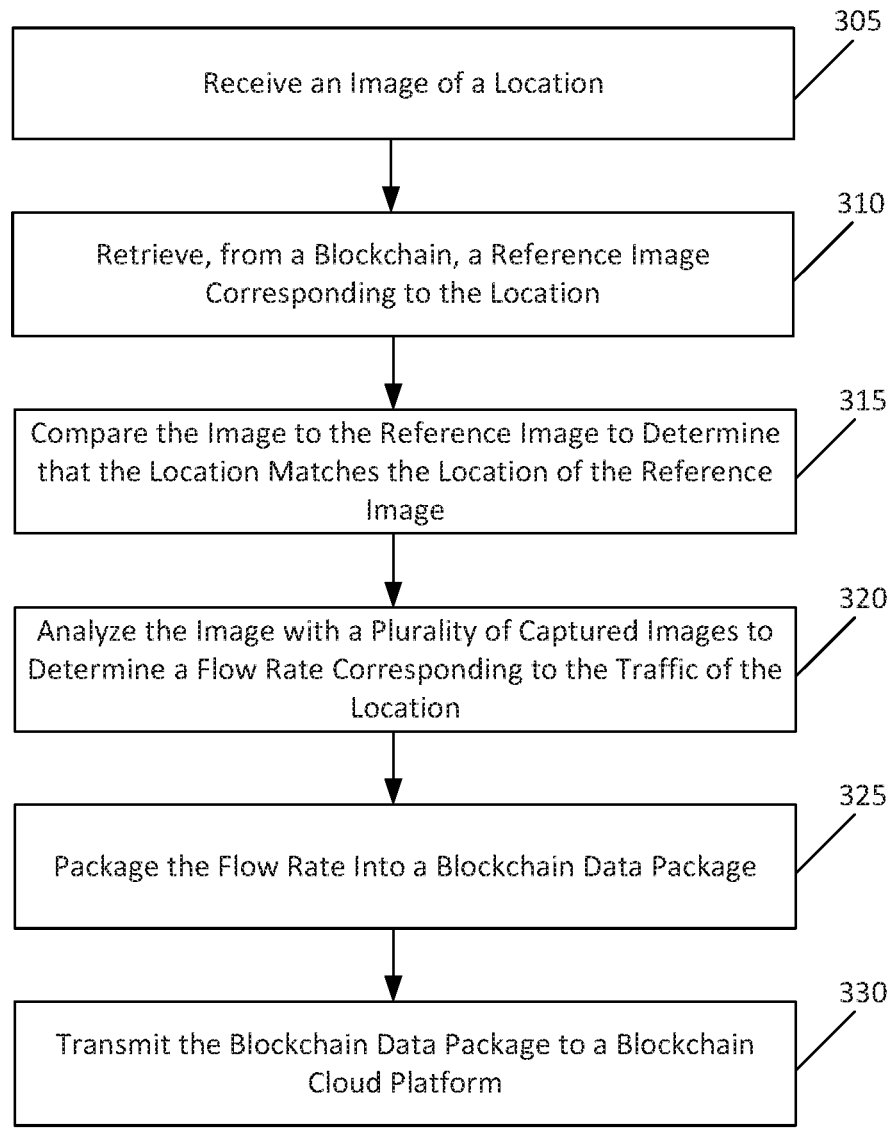
FIG. 3 depicts a flowchart illustrating a method for interfacing a shop application system to a blockchain cloud platform, according to some embodiments.

FIG. 3 depicts a flowchart illustrating a method 300 for interfacing a shop application system 150 to a blockchain cloud platform 140, according to some embodiments. Method 300 shall be described with reference to FIG. 1; however, method 300 is not limited to that example embodiment.

In an embodiment, shop application system 150 may utilize method 300 to interface a shop application system 150 to a blockchain cloud platform 140. Method 300 may perform a check to prevent fraudulent information from being uploaded to the blockchain cloud platform 140 and may also provide a flow rate calculation to the blockchain.

While method 300 is described with reference to shop application system 150, method 300 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, shop application system 150 may receive an image of a location. Shop application system 150 may receive the image from a camera. The camera may be, for example, an IP camera. Shop application system 150 may receive the image wirelessly or via a wired connection to the camera. Shop application system 150 may passively receive images from the camera or may transmit a command to the camera to capture the image. Shop application system 150 may capture many images or may capture video. Many cameras may also be used and placed to capture different angles of the location. For example, the location may be a shop or store. A first camera may capture images within the store while a second camera may capture images outside of the store. The second camera may provide sidewalk or storefront images.

At 310, shop application system 150 may retrieve, from a blockchain, a reference image corresponding to the location. Shop application system 150 may communicate with blockchain cloud platform 140 to access a blockchain. This communication may occur over a wide area network (WAN) or over the Internet. To access the blockchain, shop application system 150 may provide a key. In an embodiment, because the blockchain may be available to the public, shop application system 150 may be able to read information from the blockchain without providing separate credentials. The blockchain may store blocks that include shop information for different stores.

When accessing the blockchain, shop application system 150 may retrieve a reference image corresponding to the location. Shop application system 150 may provide an indicator of the location. This indicator may be an address or may include a unique token identifying the location or identifying shop application system 150. Shop application system 150 may obtain a reference image corresponding to the location. This reference image may be an image provided by shop application system 150 during initialization or installation of shop application system 150 at the shop. The reference image may be used to prevent the fraudulent uploading of image data from shop application system 150 onto the blockchain.

At 315, shop application system 150 may compare the image to the reference image to determine that the location matches the location of the reference image. Shop application system 150 may use image processing techniques and/or machine learning to perform this comparison. For example, shop application system 150 may identify similarities between the images. If shop application system 150 identifies an amount of similarities that exceed a threshold, shop application system 150 may identify the image as an image of the location. This identification may aid in preventing fraudulent information from being uploaded to the blockchain. Based on the confirmation, shop application system 150 may indicate that the received image may be processed to identify statistics related to the shop. Shop application system 150 may also receive many images and/or a video and perform the same analysis to determine that the received information may be used in an analysis.

At 320, shop application system 150 may analyze the image with a plurality of captured images to determine a flow rate corresponding to the traffic of the location. Because the image has been confirmed as representative of the shop, shop application system 150 may combine the image with a plurality of other captured images to determine a flow rate. The other captured images may also be verified using a reference image. This combination of images may include one or more videos. In an embodiment, the verification of the received image may allow shop application system 150 to trust a series of preceding or subsequent images so that not every images needs to be verified or compared with the reference image.

Shop application system 150 may analyze the combination of images to determine a flow rate. This analysis may track the number of different individuals over a period of time. The period of time may be represented by the number of images captured and the periodic interval between captured images. To determine the number of different individuals, shop application system 150 may apply image recognition techniques and/or machine learning techniques. Shop application system 150 may identify individuals based on, for example, facial recognition or clothing recognition. Further, if a first camera is located outside of the shop while a second camera is located within the shop, shop application system 150 may be able to compare the images across the sources to identify a particular individual so that the individual is not counted twice. After identifying different individuals, shop application system 150 may count the number of distinct intervals over a period of time. This period of time may be predetermined or shop application system 150 may continuously update a counter. Shop application system 150 may also receive information from an infrared counter and compare this information with the determined number of individuals as a secondary check.

Based on the analysis, shop application system 150 may determine a flow rate. This flow rate may be expressed as a number of individuals over an amount of time. Depending on the camera configuration, shop application system 150 may determine a first flow rate for individuals outside the shop and a second flow rate for individuals within the shop.

At 325, shop application system 150 may package the flow rate into a blockchain data package. This package may be a block that is to be added to a blockchain. The package may also include captured images and/or other information gathered by shop application system 150. For example, shop application system 150 may package transactional information from POS devices into the package. Shop application system 150 may also package processed information such as an income rating. To identify the shop and/or location, the package may include a unique identifier, such as an address or token, that identifies shop application system 150 and indicates that shop application system 150 has permission to upload information to the blockchain.

At 330, shop application system 150 may transmit the blockchain data package to the blockchain cloud platform. In this manner, shop application system 150 may include the flow rate information in a block to be added to the blockchain. This block may represent updated information related to the shop. Further, this information may be publicly available on the blockchain. Users viewing this information may have more confidence that the information provided is accurate due to the secure nature of the information capture at shop application system 150.

Figure 4:
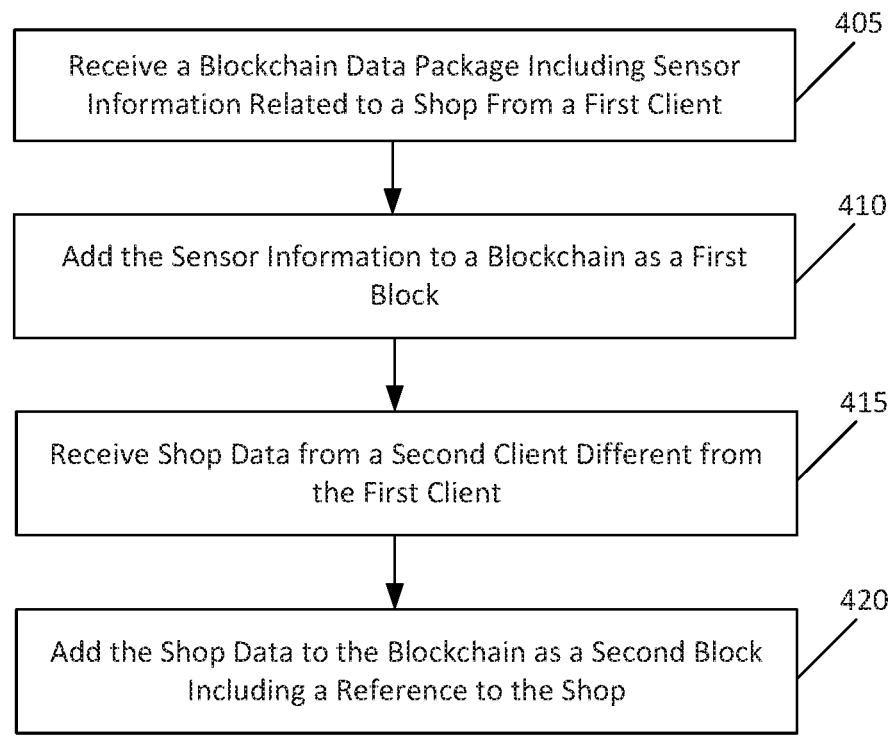
FIG. 4 depicts a flowchart illustrating a method for updating a blockchain, according to some embodiments.

FIG. 4 depicts a flowchart illustrating a method 400 for updating a blockchain, according to some embodiments. Method 400 shall be described with reference to FIG. 1; however, method 400 is not limited to that example embodiment.

In an embodiment, blockchain cloud platform 140 may utilize method 400 to update a blockchain. Method 400 may provide for the updating of a blockchain from different sources of information. While method 400 is described with reference to blockchain cloud platform 140, method 400 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, blockchain cloud platform 140 may receive a blockchain data package including sensor information related to a shop from a first client. The first client may be, for example, shop application system 150. The sensor information may include images captured by cameras or infrared counters or may include door sensor information or may count the number of times a shop door opens. The sensor information may also include information from shop journal 164 and/or POS system information. The sensor information may also include processed information from shop application system 150 including flow rate information, income information, or crime information.

At 410, blockchain cloud platform 140 may add the sensor information to a blockchain as a first block. Blockchain cloud platform 140 may determine that shop application system 150 has been granted approval or a license to add blocks to the blockchain. Blockchain cloud platform 140 may, for example, read an identifier or token from the blockchain data package to make this determination. When blockchain cloud platform 140 adds the first block, blockchain cloud platform 140 may transmit the new blockchain information to different nodes configured to perform calculations and verify the transaction.

At 415, blockchain cloud platform 140 may receive shop data from a second client different from the first client. For example, the second client may be client application system 120. Client application system 120 may provide leasing and/or ownership information related to the shop as the shop data. For example, client application system 120 may identify that a lease has been created or that a sub-lease has been created in the shop data. Similarly, client application system 120 may also indicate that a lease has been terminated. The shop data may also include rent payments or transaction information related to the shop. The shop data may also include a unique identifier, such as an address or token, that identifies client application system 120 and indicates that client application system 120 has permission to upload information to the blockchain.

At 420, blockchain cloud platform 140 may add the shop data to the blockchain as a second block including a reference to the shop. In this manner, blockchain cloud platform 140 may interface with different systems and may store information from different sources onto the blockchain. By managing both types of information, blockchain cloud platform 140 may provide unification of different information as well as a platform for transactions related to the shop. Blockchain cloud platform 140 may also publicly disseminate information on the blockchain in a manner that promotes confidence and trust due to the verification by multiple nodes.

Figure 5:
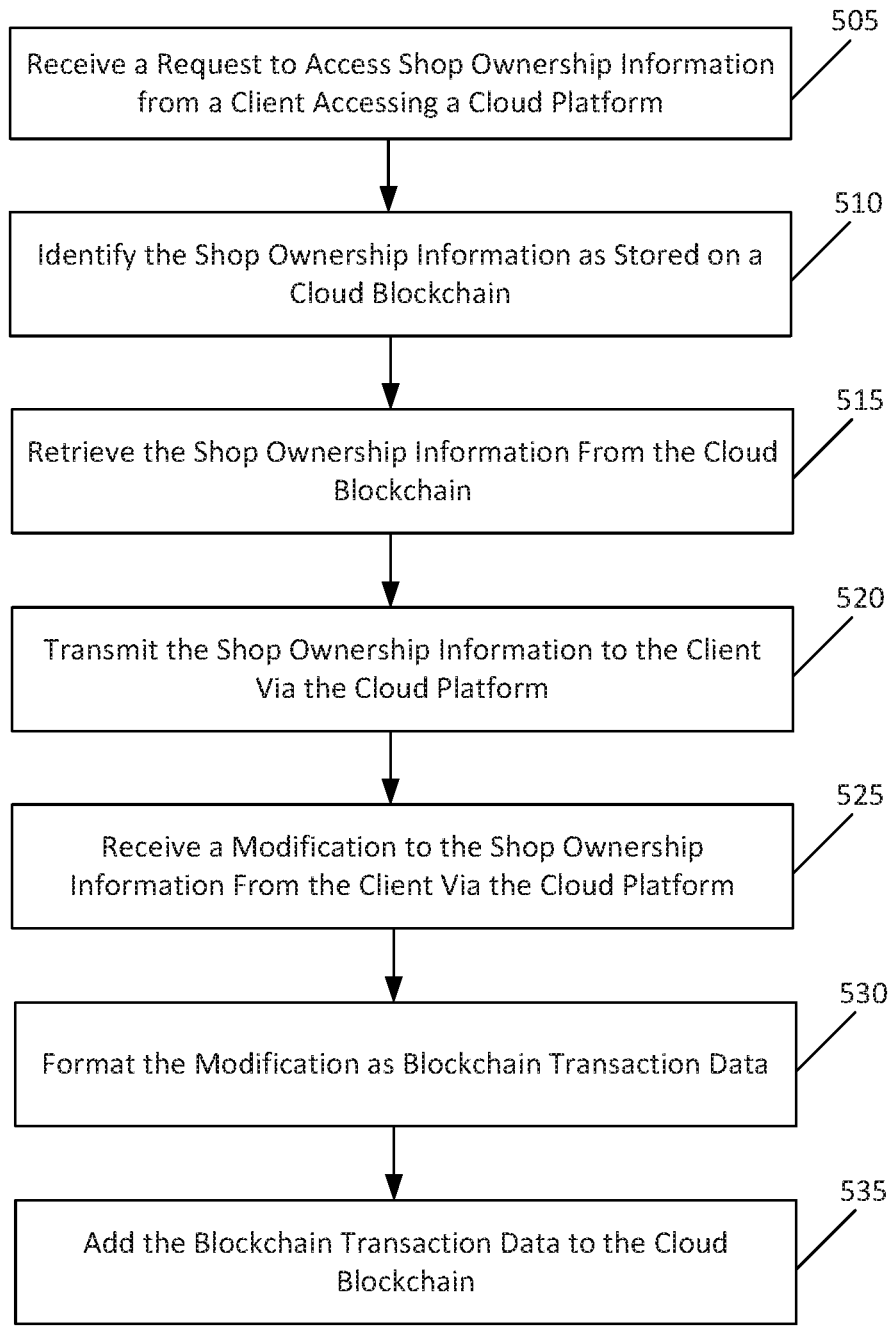
FIG. 5 depicts a flowchart illustrating a method for providing blockchain access to a client, according to some embodiments.

FIG. 5 depicts a flowchart illustrating a method 500 for providing blockchain access to a client, according to some embodiments. Method 500 shall be described with reference to FIG. 1; however, method 500 is not limited to that example embodiment.

In an embodiment, client application system 120 may utilize method 500 to update a blockchain. Method 500 may provide for the updating of a blockchain from a client 130A using client application system 120. While method 500 is described with reference to client application system 120, method 500 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, client application system 120 may receive a request to access shop ownership information from a client 130A accessing a cloud platform. For example, client application system 120 may be hosted in a cloud computing platform. Client 130A may perform cloud computing and access client application system 120 within the cloud computing platform. The request may include login information or credentials indicating that client 130A may access the shop ownership information. In an embodiment, the shop ownership information may be public and credentials may not be required to view the ownership information. The ownership information may include records indicating shop ownership. For example, the ownership information may include deeds or titles. The ownership information may also include tenancy documents such as, for example, leases, sub-leases, or other contracts.

At 510, client application system 120 may identify the shop ownership information as stored on a cloud blockchain. For example, client application system 120 may include locally managed data stored in location database 124. This data may be temporary or may relate to user account information. For example, if a potential tenant is in the processing of completing a lease application, location database 124 may store in this information. When the lease is fully executed, client application system 120 may transmit the information to the blockchain. In this manner, the data stored in location database 124 may not have been stored in the blockchain because the blockchain may store complete transactions. At 510, however, the shop ownership information may be identified as being already stored on the cloud blockchain.

At 515, client application system 120 may retrieve the shop ownership information from the cloud blockchain. As previously described, this process may or may not require credentials from the requesting client 130A to view the information. At 520, client application system 120 may transmit the shop ownership information to the client via the cloud platform. In this manner, client 130A may view the shop ownership information within the cloud computing platform being used.

At 525, client application system 120 may receive a modification to the shop ownership information from the client 130A via the cloud platform. To allow this modification, client application system 120 may determine that client 130A has provided sufficient credentials. For example, client application system 120 may confirm that the modification has been made by the owner of the property or shop. In this manner, client application system 120 may request login credentials such as a username and/or password before performing the modification. Similarly, depending on the modification desired, a tenant may perform the modification. For example, the modification may be to renew or to terminate a lease. A property owner may also determine to change the amount of rent associated with the lease. The property owner may also transfer ownership of the property. In this manner, a modification of shop ownership information may be performed after a user having permissions has been authenticated.

At 530, client application system 120 may format the modification as blockchain transaction data. The blockchain transaction data may be in the form of a block. In an embodiment, client application system 120 may format the modification along with other transactions into a block. In an embodiment, client application system 120 may transmit the modification as the blockchain transaction data to blockchain cloud platform 140. Blockchain cloud platform 140 may then format the modification data into a block.

At 535, blockchain cloud platform 140 may add the blockchain transaction data to the cloud blockchain. Blockchain cloud platform 140 may add the blockchain transaction data as a block to the blockchain. Blockchain cloud platform 140 may then distribute the updated information to nodes participating in the blockchain. In this manner, the updated or modified ownership information may be recognized and verified by the nodes of the blockchain. This verification may lead to increased confidence about the record as well as act as a public record indicating ownership or leasing information.

Figure 6:
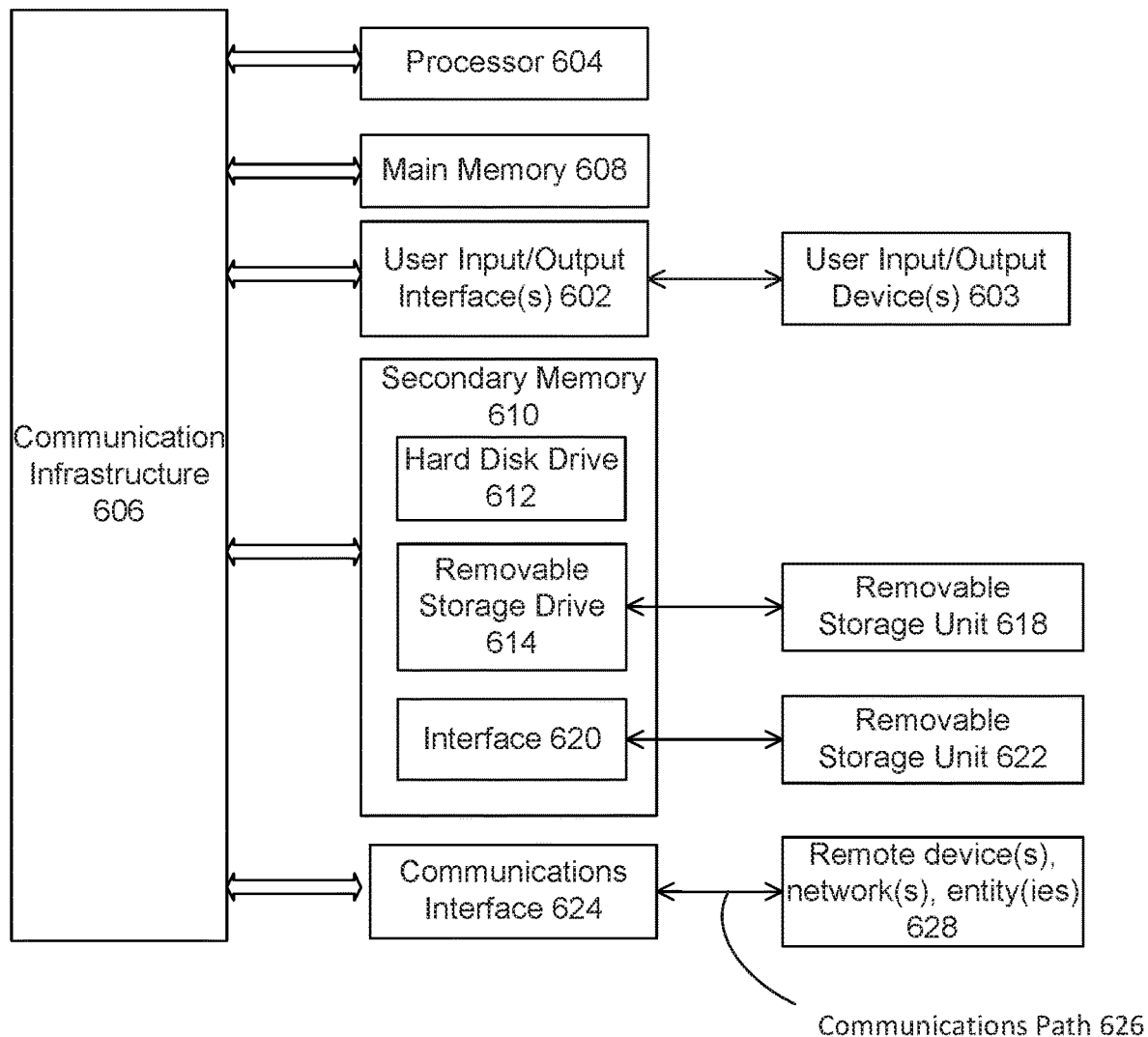
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    receiving an image of a location;
    retrieving, from a server implementing a blockchain cloud platform, a reference image stored on a blockchain, wherein the reference image depicts a reference location;
    comparing the image to the reference image to determine that the location matches the reference location;
    analyzing the image with a plurality of captured images to determine a flow rate corresponding to traffic of the location;
    packaging the flow rate into a blockchain data package; and
    transmitting the blockchain data package to the server implementing the blockchain cloud platform.

2. The computer implemented method of claim 1, further comprising:
    packaging the flow rate with the image in the blockchain data package.

3. The computer implemented method of claim 1, further comprising:
    periodically capturing updated images;
    updating the flow rate based on an analysis of the updated images to generated updated flow rates; and
    periodically transmitting blockchain data packages including the updated flow rates to the server implementing the blockchain cloud platform.

4. The computer implemented method of claim 1, further comprising:
    packaging shop journal data in the blockchain data package.

5. The computer implemented method of claim 1, further comprising:
    receiving shop inventory transaction data;
    calculating a frequency of transactions based on the shop inventory transaction data; and
    packaging the frequency of transactions into the blockchain data package.

6. The computer implemented method of claim 1, further comprising:
    crawling a database storing criminal records using an identifier of the location to filter results;
    identifying a record corresponding to the location; and
    packaging the record in the blockchain data package.

7. The computer implemented method of claim 1, further comprising:
    comparing the flow rate to infrared counter data;
    determining that the flow rate matches the infrared counter data; and
    in response to the determining, packaging the flow rate into the blockchain data package.

8. A system, comprising:
    a memory; and
    at least one processor coupled to the memory and configured to:
        receive an image of a location;

retrieve, from a server implementing a blockchain cloud platform, a reference image stored on a blockchain, wherein the reference image depicts a reference location;

compare the image to the reference image to determine that the location matches the reference location;

analyze the image with a plurality of captured images to determine a flow rate corresponding to traffic of the location;

package the flow rate into a blockchain data package; and transmit the blockchain data package to the server implementing the blockchain cloud platform.

9. The system of claim 8, wherein the at least one processor is further configured to:

package the flow rate with the image in the blockchain data package.

10. The system of claim 8, wherein the at least one processor is further configured to:

periodically capture updated images;

update the flow rate based on an analysis of the updated images to generated updated flow rates; and periodically transmit blockchain data packages including the updated flow rates to the server implementing the blockchain cloud platform.

11. The system of claim 8, wherein the at least one processor is further configured to:

package shop journal data in the blockchain data package.

12. The system of claim 8, wherein the at least one processor is further configured to:

receive shop inventory transaction data;

calculate a frequency of transactions based on the shop inventory transaction data; and package the frequency of transactions into the blockchain data package.

13. The system of claim 8, wherein the at least one processor is further configured to:

crawl a database storing criminal records using an identifier of the location to filter results;

identify a record corresponding to the location; and package the record in the blockchain data package.

14. The system of claim 8, wherein the at least one processor is further configured to:

compare the flow rate to infrared counter data;

determine that the flow rate matches the infrared counter data; and in response to the determining, package the flow rate into the blockchain data package.

15. A non-transitory computer-readable device having instructions stored thereon that, when executed by at least one computing device, cause the at least one computing device to perform operations comprising:

receiving an image of a location;

retrieving, from a server implementing a blockchain cloud platform, a reference image stored on a blockchain, wherein the reference image depicts a reference location;

comparing the image to the reference image to determine that the location matches the reference location;

analyzing the image with a plurality of captured images to determine a flow rate corresponding to traffic of the location;

packaging the flow rate into a blockchain data package; and transmitting the blockchain data package to the server implementing the blockchain cloud platform.

16. The non-transitory computer-readable device of claim 15, the operations further comprising:

packaging the flow rate with the image in the blockchain data package.

17. The non-transitory computer-readable device of claim 15, the operations further comprising:

periodically capturing updated images;

updating the flow rate based on an analysis of the updated images to generated updated flow rates; and periodically transmitting blockchain data packages including the updated flow rates to the server implementing the blockchain cloud platform.

18. The non-transitory computer-readable device of claim 15, the operations further comprising:

receiving shop inventory transaction data;

calculating a frequency of transactions based on the shop inventory transaction data; and packaging the frequency of transactions into the blockchain data package.

19. The non-transitory computer-readable device of claim 15, the operations further comprising:

crawling a database storing criminal records using an identifier of the location to filter results;

identifying a record corresponding to the location; and packaging the record in the blockchain data package.

20. The non-transitory computer-readable device of claim 15, the operations further comprising:

comparing the flow rate to infrared counter data;

determining that the flow rate matches the infrared counter data; and in response to the determining, packaging the flow rate into the blockchain data package.

* * * * *